United States Patent [19]

Chen

[11] Patent Number: 5,397,086
[45] Date of Patent: Mar. 14, 1995

[54] CAMERA TRIPOD HEAD

[76] Inventor: Chien S. Chen, 4th Fl., No. 2-3, Lane 313, Chang An St., Lu Chou Hsiang, Taipei Hsien, Taiwan, Prov. of China

[21] Appl. No.: 984,556

[22] Filed: Dec. 2, 1992

[51] Int. Cl.$^6$ .......................................... F16M 11/12
[52] U.S. Cl. .................................... 248/183; 248/179; 354/293
[58] Field of Search ................. 248/178, 179, 183; 354/81, 293; 352/243

[56] References Cited

U.S. PATENT DOCUMENTS

| | | | |
|---|---|---|---|
| 2,556,598 | 6/1951 | Rasine | 248/179 |
| 3,109,617 | 11/1963 | Meyer | 248/186 |
| 4,451,020 | 5/1984 | Posso | 248/183 |
| 4,697,772 | 10/1987 | Kosugi et al. | 248/183 |
| 5,012,265 | 4/1991 | Nakatani | 248/179 |

FOREIGN PATENT DOCUMENTS

| | | | |
|---|---|---|---|
| 2840060 | 4/1980 | Germany | 248/178 |
| 82381 | 1/1935 | Sweden | 248/183 |

Primary Examiner—Hien H. Phan
Attorney, Agent, or Firm—Marks & Murase; Michael D. Bednarek

[57] ABSTRACT

A tripod head comprising (a) a plate connecting with a camera, (b) a camera platform for receiving, (c) two joints linking said camera platform to a central post of a tripod, one of said joints enabling said camera platform to rotate about an axis perpendicular to an axis of the central post while the remaining of said joints enabling said camera platform to rotate about the axis of the central post and (d) a handle for rotating said camera platform, comprising a coupler connecting with said camera platform and a grip pivotably connecting with said coupler.

9 Claims, 3 Drawing Sheets

CAMERA TRIPOD HEAD

BACKGROUND OF INVENTION

1. Field of Invention

The present invention relates to a camera and, more particular, to a tripod for carrying cameras and, still more particularly, to a tripod head and, still more particularly, to an engagement of a mounting plate with a camera platform and, still more particularly, to an adjustable handle attached to a camera platform.

2. Related Prior Art

When photographers take pictures, tripods are often used as auxiliary tools for cameras. Each camera has a threaded bore at it bottom. The threaded bores of all cameras have the same size. Each tripod has a tripod head and a tripod body. The tripod head has a mounting plate, a camera platform, a bar, a first joint and a second joint. The tripod body has a central post and three telescopic legs. The mounting plate has a hole through which a threaded bolt is inserted. The threaded bolt is rotatably attached to the mounting plate. The threaded bolt can be secured in the threaded bore by rotating a C-handle which is pivotably attached to the threaded bolt, so that the mounting plate is securely attached to the camera. Threaded bolts incorporated in all mounting plates have the same size of the threaded bores as defined in the cameras, so that all cameras mate with all tripods. The mounting plate is detachably mounted on the camera platform. The camera platform is attached to the central post by means of a first joint and a second joint. The camera is allowed to rotate about an axis perpendicular to a central axis of the central post by means of the first joint. The camera is allowed to rotate about the central axis of the central post by means of the second joint. A bar is secured to the camera platform. Thus, a user can operate the bar with one hand for manipulating the angle of the camera and press a shutter release with another hand for shooting. However, the bar is secured to the camera platform at a position so that the bar is only suitable for the manipulation of the left hand of the user. Therefore, the present invention is intended to solve the above-mentioned problem.

SUMMARY OF INVENTION

It is an object of the present invention to provide an engagement of a mounting plate with a camera platform.

It is another object of the present invention to provide a handle having an adjustable position relative to a camera platform.

It is still another object of the present invention to provide a handle consisting of a coupler adjustably linked to a camera platform and a grip pivotably attached to the coupler.

DETAILED DESCRIPTION OF INVENTION

Figure 1:
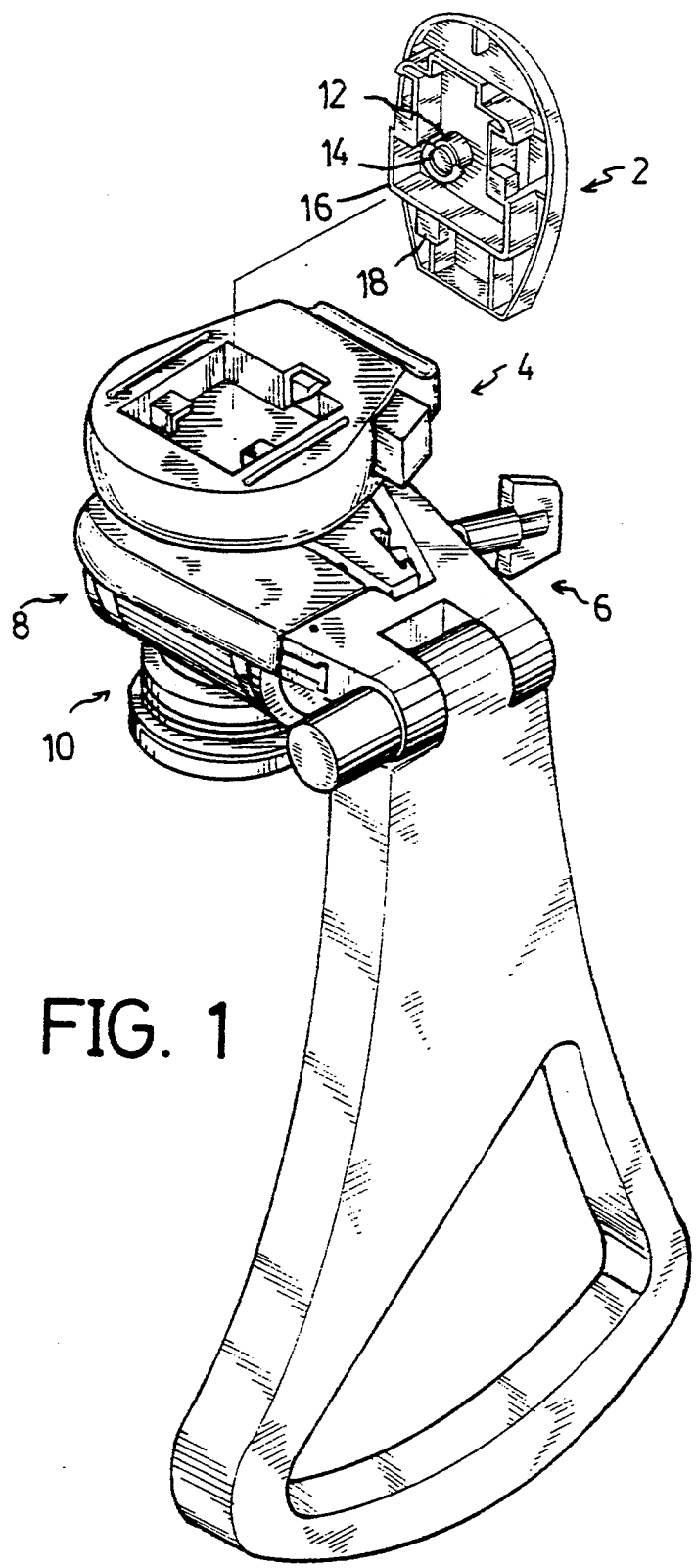
FIG. 1 is a perspective view of tripod head, showing a mounting plate, a camera platform, a handle, a first joint and a second joint.

Referring to the drawings and, initially, to FIG. 1, a tripod head has a mounting plate 2, a camera platform 4, a handle 6, a first joint 8 and a second joint 10.

The mounting plate 2 defines a hole through which a threaded bolt 12 is inserted. As, the threaded bolt 12 is rotatably linked to the mounting plate 2 in a conventional way, further description will not be necessary. In use, the threaded bolt 12 is secured in a threaded bore defined in a bottom of a camera by means of a C-handle 14 pivotably linked to the threaded bolt 12, so that the mounting plate 2 is securely attached to the camera.

The mounting plate 2 has a first side contacting the camera and a second side defining an engaging portion. The engaging portion consists of a continuous wall 16 defining a closed area and a tongue 18 protrudes from the wall 16. The tongue 18 has an inclined surface.

Figure 2:
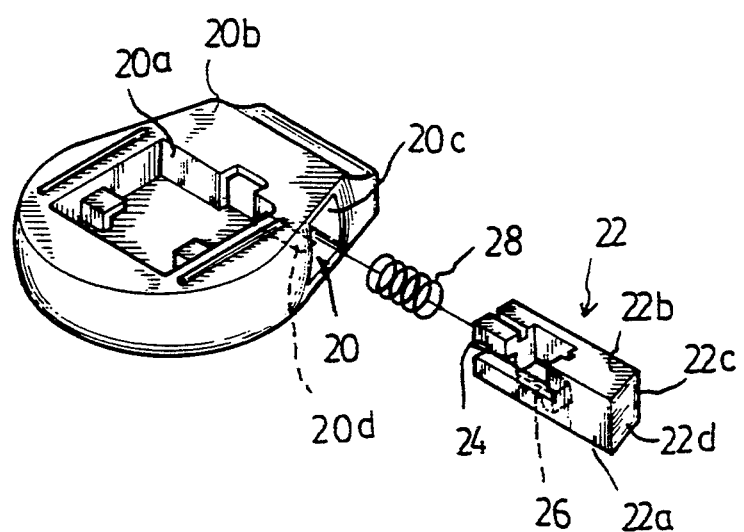
FIG. 2 is an exploded view of a camera platform.

Additionally referring to FIG. 2, the camera platform 4 has a cavity corresponding to the engaging portion of the mounting plate 2. The camera platform 4 has a chamber 20 which is defined by a wall 20a facing the cavity, a wall 20b, a wall 20c and a wall 20d. The chamber 20 has an opening formed in the wall 20a and partially in the wall 20b. The wall 20d has a slot.

A latch 22 has an outline corresponding to the chamber 20, so that the latch 22 can slide in and along the chamber 20. The latch 22 is defined by a first wall 22a facing the cavity, a second wall 22b, a third wall 22c and a fourth wall 22d. The latch 22 a recess formed in the wall 22a and partially in the wall 22b. Beside the recess is formed a wedge 24 corresponding to the tongue 18. On the wall 22d is formed a flexible tongue 26 with a tab formed at its tip.

A spring 28 is received in the chamber 20. Then, the latch 22 is received in the chamber 20. The tab of the tongue 26 is configured so that the latch 22 can be easily pressed in the tubular portion. The tab of the flexible tongue 26 is received in the slot defined in the wall 20d. Hereinafter, the will not be easily pulled out of the chamber 20. The spring 28 urges the latch 22 to a first end of the slot so that the opening defined in chamber does not align with the recess defined in the latch 22. The latch 22 can be further pushed into the chamber 20. When the tab of the flexible tongue 26 is pushed to a second end of the slot, the opening defined in the tubular portion aligns with the recess defined in the latch 22. Thus, the tongue 18 is allowed to be received in the opening defined in the chamber 20, through the opening defined in the latch 22. When the latch 22 is released, the spring 28 pushes the latch 22 outwards of the chamber 20. The tongue 26 engages with the tongue 18, thereby locking the engaging portion of the mounting plate 2 in the cavity of the camera platform 4. If the latch 22 is pushed into the chamber 20, i.e., the recess defined in the latch 22 aligns with the opening defined in the chamber 20, the tongue 18 is permitted to disengage from the wedge 24. The mounting plate 2 can be removed from the camera platform 4. Thus, the mounting plate 2 is detachably engaged in the camera platform 4.

Figure 3:
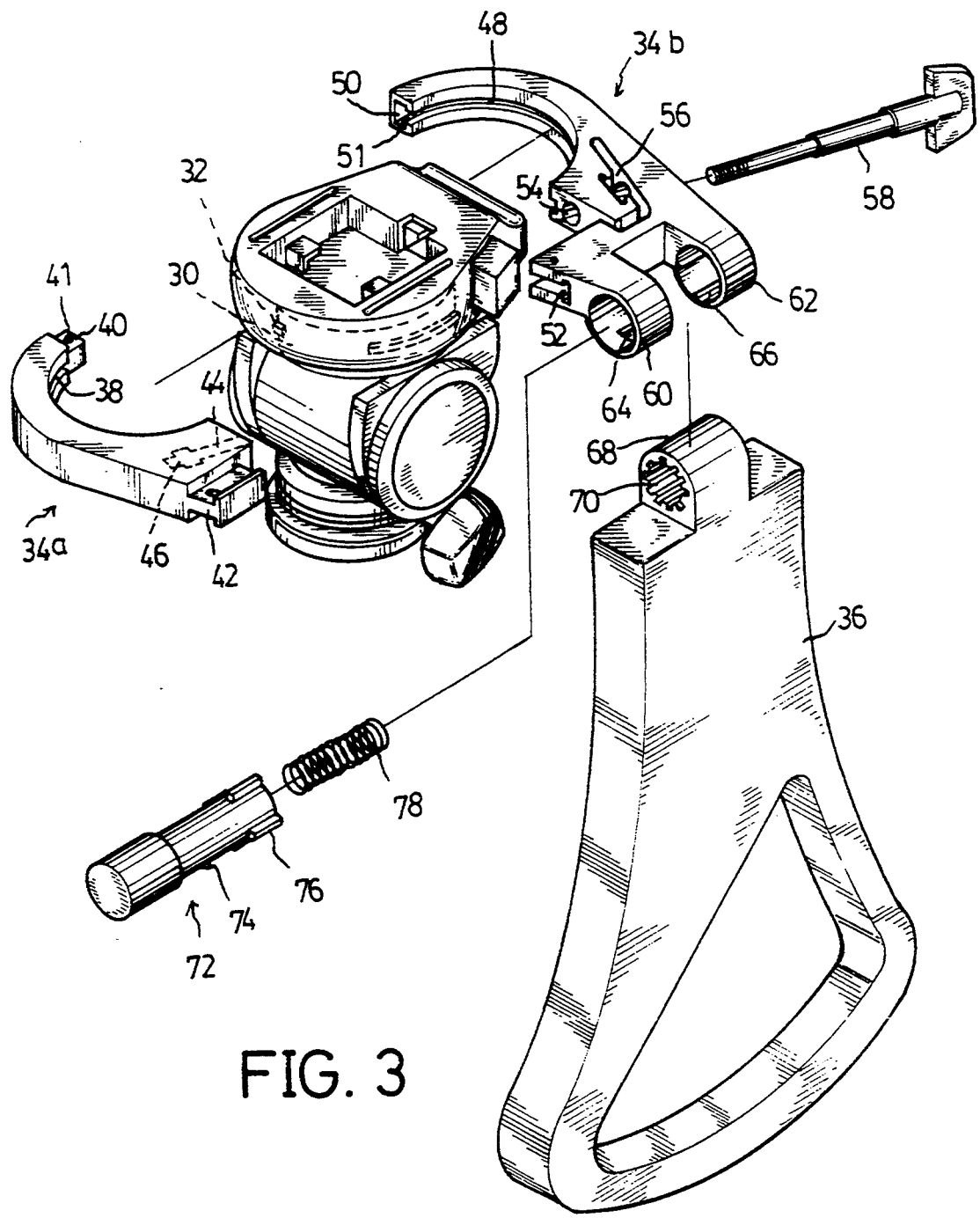
FIG. 3 is an exploded view of a handle.

Referring to FIG. 3, a neck 30 is formed below the camera platform 4. Two arc-shaped flanges 32 are formed about the neck 30.

The handle 6 has a coupler 34 consisting of two sections 34a and 34b and a grip 36. The section 34a has a semi-circular cutoff, thereby forming a semi-cylindrical wall corresponding to the neck 30. A groove 38 is formed in the semi-cylindrical wall, corresponding to the flange 32. A tongue 40 longitudinally protrudes from a first terminal portion of the section 34a. A threaded hole 41 is defined in the tongue 40. A slide 42 is formed on and beside a second terminal portion of the section 34a. The slide 42 has a T-shaped cross section. A bore 44 is formed in the second terminal portion of the section 34a. A threaded nut 46 is fixed in the stop end of the bore 44.

The section 34b has a semi-circular cutout so as to form a semi-cylindrical wall corresponding to the neck 30. A groove 48 is formed in the semi-cylindrical wall of the section 34b, corresponding to the flange 32. A recess 50 is defined in the section 34b for receiving the tongue 40. A hole 51 is defined in the section 34b and communicates with the recess 50. A guide 52 is defined in the section 34b, for receiving the slide 42. A passage 54 is defined in the section 34b, corresponding to the bore 44. A slit 56 is defined in the section 34b, for providing room for compression.

For linking the section 34a to the section 34b, the tongue 40 is received in the recess of the section 34b, and the slide 42 is received in the guide 52, while the flanges 30 are received in the grooves 38 and 48. A screw is inserted through the hole 51 and secured in the threaded hole 41. Thus, the coupler 34 is allowed to rotate about the neck 30, so that the position of the coupler 34 with respect to the neck 30 can adjusted. A threaded bolt 58 can be secured in the threaded nut 46 by means of a knob, for linking the sections 34a and 34b to each other. The slit 56 is reduced in width when the semi-cylindrical walls respectively of the sections 34a and 34b firmly abut the neck 30.

The section 34b further has a tubular portion 60 and a tubular portion 62 which is closed at one of its ends. The tubular portion 60 separately aligns with the tubular portion 62. The tubular portion 60 has a slot 64. The tubular portion 62 has a plurality of grooves 66. The grip 36 has a tubular portion 68 defining a number of grooves 70. A shaft 72 has a first end and a second end. A tab 74 is formed at about the middle point of the shaft 72, so that the tab 74 can be easily pushed in the slot, but not easily pulled out of the slot. A number of slides 76 are formed near the second end of the shaft 72.

To assemble the coupler 34 and the grip 36, a spring 78 is sited in the tubular portion 62. The tubular portion 68 is sited between so as to align with the tubular portion 60 and tubular portion 62. The shaft 72 is partially inserted into, with the first end remaining out, the tubular portions 60, 68 and 62. The tab 74 is received in the slot 64 in order to retain shaft 72 in the tubular portions 60, 68 and 62, although the shaft 72 is biased by the spring 78. At that instant, the slides 76 are partially received in the grooves 66 and partially received in the grooves 70, so that the grip 36 is restrained from pivoting relative to the coupler 34. The slides 76 will be completely received in the grooves 66 if the first end of the shaft 72 is pressed into the tubular portion 60. As the slides 76 no longer engage with the grooves 70, the grip 36 is allowed to pivot relative to the coupler.

I claim:

1. A tripod head comprising:
a camera platform;
a joint assembly comprising a first joint being linked to the camera platform so that the camera platform is rotatable about a horizontal axis and a second joint being linked to a central post of a tripod so that the camera platform is rotatable about a vertical axis; and
a handle comprising a grip being linked by means of a shaft to a coupler for coupling the grip to the camera platform, the coupler comprising separated first and second tubular portions formed at an end, the first tubular portion of the coupler comprising several grooves longitudinally formed therein, the shaft comprising several slides longitudinally formed thereon for engaging with the grooves formed in the first tubular portion of the coupler, the grip comprising a tubular portion formed at an end and, the tubular portion of the grip comprising several grooves longitudinally formed therein, the tubular portion of the grip being disposed between the first and second tubular portions of the coupler with the shaft being slidably inserted therein for linking the grip to the coupler, the slides formed on the shaft being further engageable in the grooves formed in the tubular portion of the grip for keeping the grip from rotating with respect to the coupler, the slides formed on the shaft being disengageable from the grooves formed in the tubular portion of the grip for allowing the grip to rotate relative to the coupler.

2. A tripod head in accordance with claim 1, further comprising a spring disposed in said first tubular portion of said coupler for pushing said shaft for engaging said slides with said grooves defined in said first tubular portion of said coupler and said grooves defined in said tubular portion of said grip and means for retaining said shaft in said first and second tubular portions of said coupler and said tubular portion of said grip.

3. A tripod head in accordance with claim 1, further comprising a slot longitudinally formed in the first tubular portion of said coupler and a tab formed on said shaft, said tab being engageable in said slot for retaining said shaft in said tubular portions.

4. A tripod head in accordance with claim 1, wherein said platform comprises a column projecting downward from an underside thereof, said coupler comprises a first section comprising a cutout formed therein and a second section comprising a cutout formed therein, the first and second sections of the coupler engage with each other so that the cutouts formed therein form a hole wherein the column of the camera platform is received.

5. A tripod head in accordance with claim 4, wherein said first section of said coupler comprises bore formed therein, said second section of said coupler comprises a passage formed therein, a nut is secured in the bore formed in the first section of the coupler, a butterfly bolt is inserted through the passage formed in the second section of the coupler and further into the bore formed in the first section of said coupler so as to engage with the nut.

6. A tripod head in accordance with claim 4, wherein said column comprises at least a flange circumferentially formed thereon, said first and second sections each comprise a groove formed therein, said first and second sections of said coupler each comprise a groove formed therein, said flange of the column is engageable with the grooves formed in said first and second sections of said coupler.

7. A tripod head in accordance with claim 4, further comprising a recess formed in a first end of said first section of said coupler and a tongue formed on a second end of said second section of said coupler, said tongue being engageable in said recess.

8. A tripod head in accordance with claim 4, wherein said first section of said coupler comprises a slide formed on a second end, said second section of said coupler comprises a groove formed in a second end, said slide formed on said first section of said coupler is received in the groove formed in said second section of said coupler.

9. A tripod head in accordance with claim 8, wherein said slide formed on the second end of said first section of said coupler comprises a T-shaped configuration as shown in a cross-sectional view.

* * * * *

UNITED STATES PATENT AND TRADEMARK OFFICE
CERTIFICATE OF CORRECTION

PATENT NO. : 5,397,086
DATED : March 14, 1995
INVENTOR(S) : Chien Shu CHEN It is certified that error appears in the above—identified patent and that said Letters Patent is hereby corrected as shown below:

On the title page, item [75] Iventors: "Prov. of China" should read --Rep. of China--.

Signed and Sealed this

First Day of August, 1995

Attest:

BRUCE LEHMAN

Attesting Officer    Commissioner of Patents and Trademarks